Jan. 25, 1966  J. W. BATES  3,231,751
BOOSTER REGULATOR
Filed Feb. 27, 1961  3 Sheets-Sheet 2
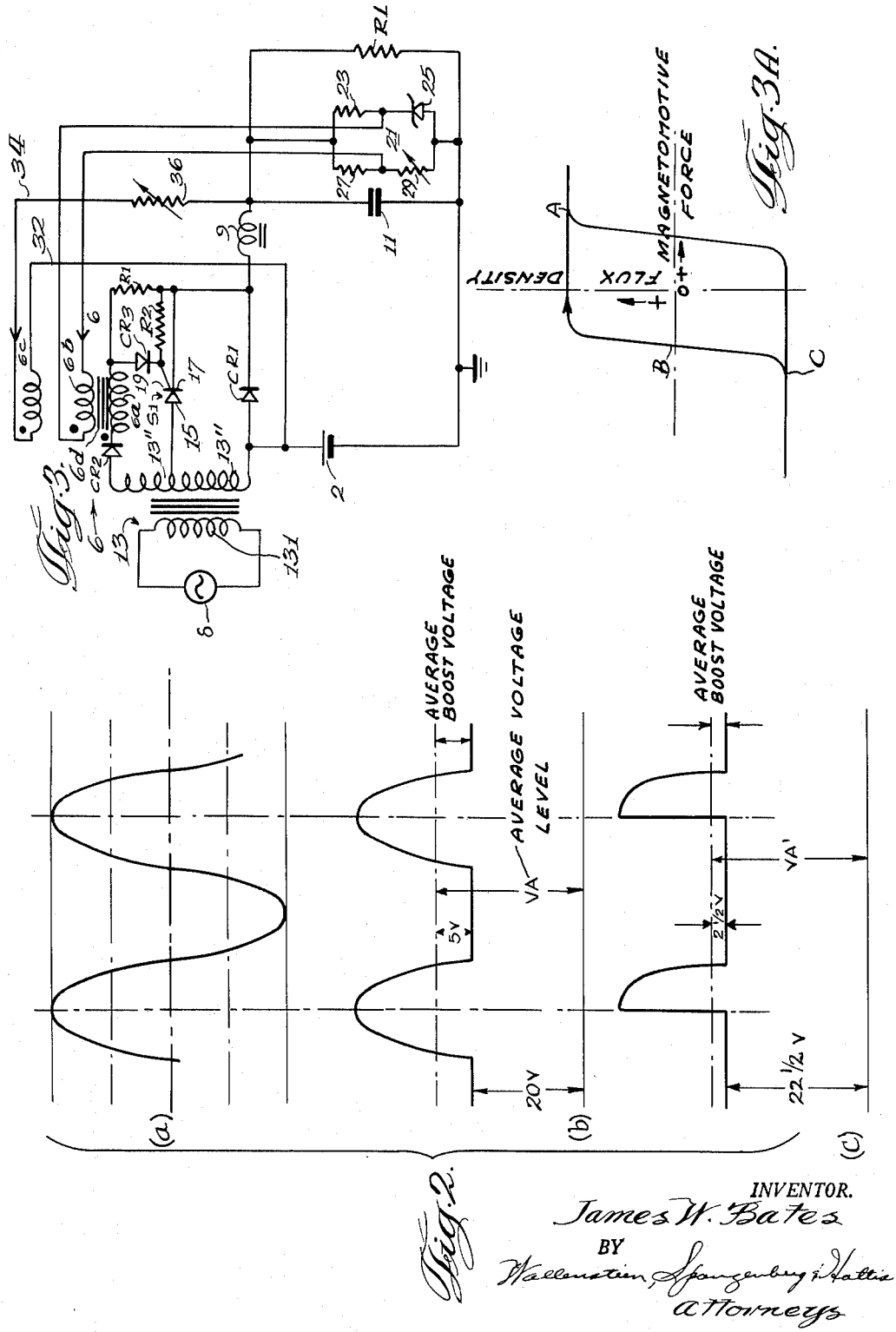
INVENTOR.
James W. Bates
BY
Wallenstein, Spangenberg & Hattis
Attorneys

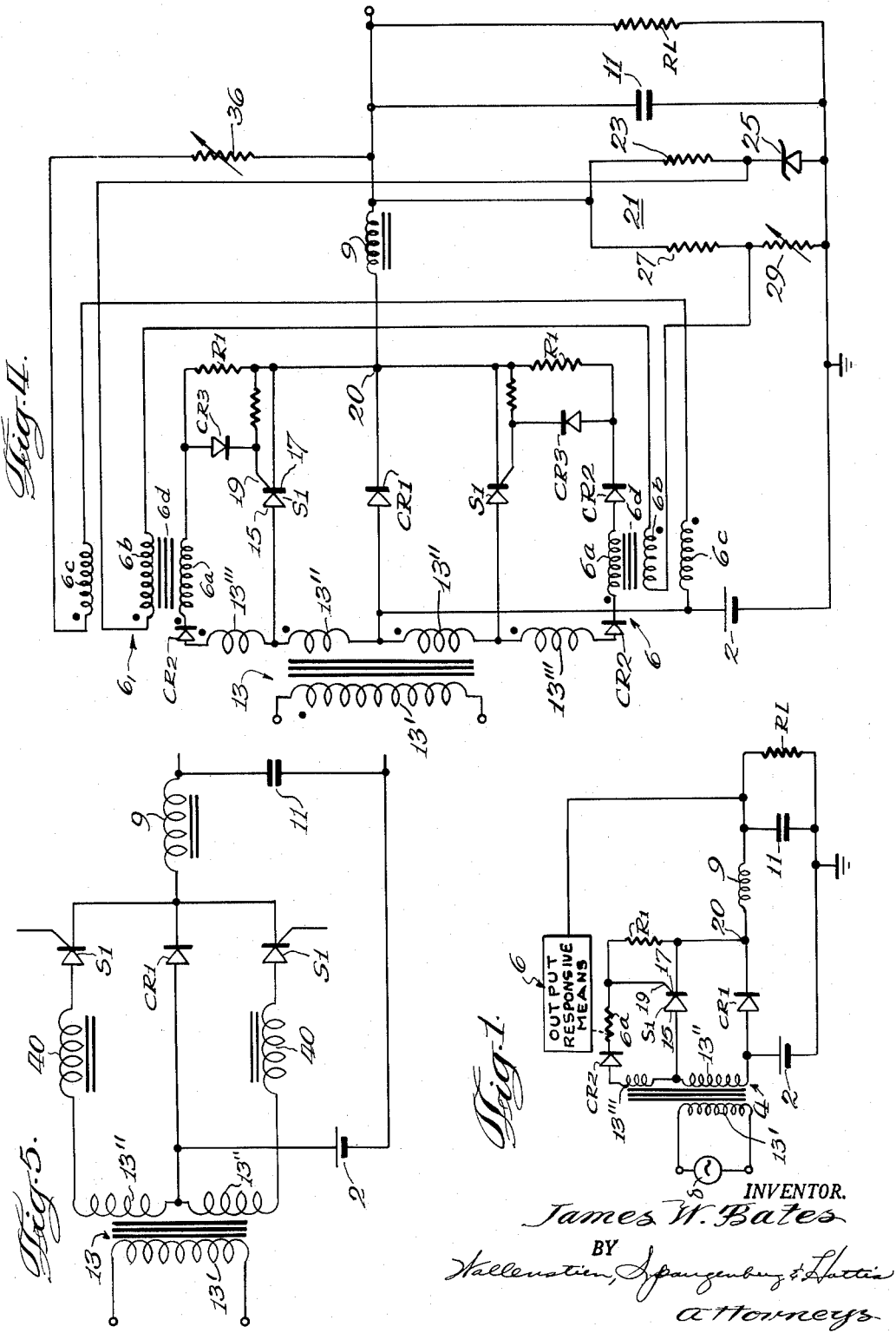

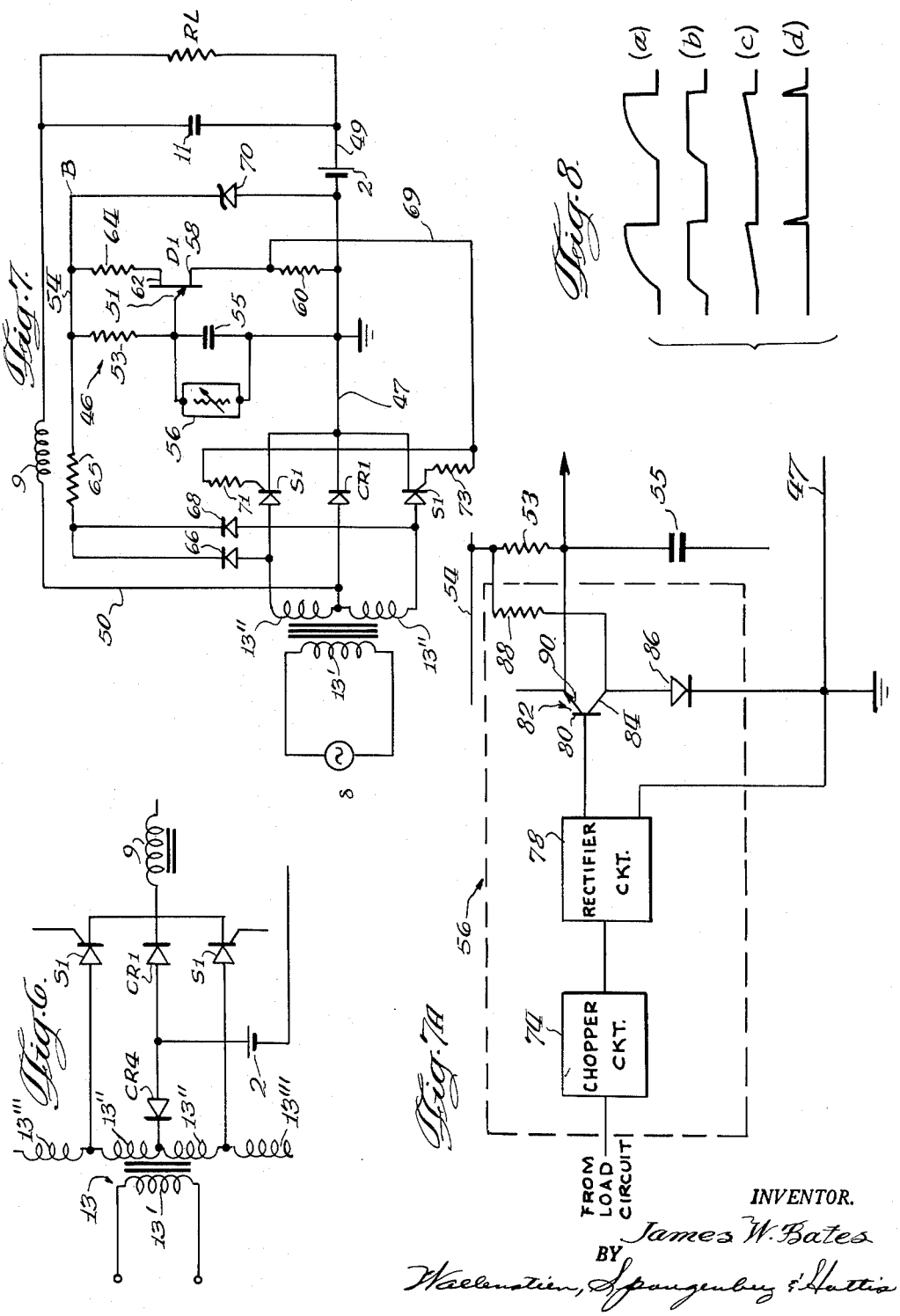

United States Patent Office 3,231,751
Patented Jan. 25, 1966

3,231,751
BOOSTER REGULATOR
James William Bates, Palos Verdes, Calif., assignor to Gulton Industries, Inc., Metuchen, N.J., a corporation of New Jersey
Filed Feb. 27, 1961, Ser. No. 91,703
20 Claims. (Cl. 307—52)

This invention relates to a voltage or current regulator circuit which preferably utilizes semiconductors and magnetic components to change the magnitude of a direct current voltage to a desired controlled voltage. Some aspects of the invention relate to the use in such a circuit of controlled semiconductors such as gated diodes, switching elements with saturable reactors or voltage pulsers as the triggering or controlling elements.

It is an object of this invention to provide a new and improved direct current booster voltage control circuit having a high degree of reliability and efficiency. Another object of the invention is to provide such a circuit which can use small, rugged components, such as magnetic core and semiconductor elements.

In general, a voltage booster regulator is one which adds a desired voltage to a variable direct current voltage to maintain a constant output voltage across a load. The booster regulators heretofore developed, for example, frequently used large, high power magnetic amplifiers as a booster voltage control element, the magnetic amplifiers being so positioned as to carry appreciable load currents which resulted in significant power losses.

A specific object of the present invention is to provide a voltage or current booster regulator preferably using one or more relatively small magnetic amplifiers carrying relatively small control currents to minimize power losses, and further, preferably including gated diodes or the like as the boost current carrying elements.

In accordance with one aspect of the present invention, the regulator circuit includes a gated diode and a source of alternating current boost voltage connected between the source of direct current voltage to be regulated and the output of the regulator circuit. The gated diode has a control electrode connected to a variable phase pulse source. The pulse source preferably includes a magnetic amplifier responsive to an output voltage or current sensing circuit to vary the firing time of the gated diode in accordance with the boost voltage or current demanded by the output conditions of the booster circuit. For full or near maximum output conditions of the source of direct current voltage, the gated diode conducts for only a portion of each active half cycle of the alternating current boost voltage; as the output of the direct current voltage source drops, the conducting time for the gated diode increases in amount determined by the boost voltage demanded by the output conditions of the regulator circuit.

A further feature of the invention is that the control circuit for the gated diode includes a magnetic amplifier between the control electrode of the diode and a source of alternating current voltage of the same phase and frequency as the alternating current boost voltage, the latter source, for example, being the winding of a transformer fed from the same voltage source from which the boost voltage is obtained. A voltage pulse is coupled to the gated diode when the magnetic amplifier saturates, which occurs at a time depending on the conditions of the output sensing circuit. When the gated diode fires, the current drain of the control circuit is automatically reduced to conserve power.

For a better understanding of the aforesaid and other features of the invention, together with other and further objects thereof, reference should now be made to the following detailed description taken in connection with the accompanying drawings, wherein:

FIG. 1 is a circuit diagram of a basic embodiment of the invention;
FIG. 2 shows various waveforms in the circuit shown in FIG. 1 which indicates the manner of operation of the circuit;
FIG. 3 is a booster circuit like that shown in FIG. 1 with a magnetic amplifier incorporated therein;
FIG. 3A is a hysteresis curve for the core of the magnetic amplifier shown in FIG. 3;
FIG. 4 is a schematic diagram of a preferred form of the invention;
FIG. 5 shows a particular circuit diagram of a modification of the circuit shown in FIG. 4;
FIG. 6 shows a still further modified form of the invention;
FIGS. 7 and 7A show a further modified form of the invention; and
FIG. 8 shows voltage waveforms present in the circuit of FIG. 7.

Refer to FIG. 1 where a basic circuit of the present invention is shown. A direct current supply 2 which may be a battery constitutes the main direct current input to the circuit. In accordance with the present invention, a novel booster circuit generally indicated by reference numeral 4 is connected between the battery source 2 and a load resistor RL to add to the voltage of the battery source 2, where necessary, to maintain a substantially fixed output voltage. As illustrated, the booster circuit utilizes efficient semiconductor devices, namely a three terminal gated diode S1, which operates similar to a thyratron tube, and two terminal diodes CR1 and CR2 operating in conjunction with an alternating current (A.C.) boost voltage source 13″ and an output responsive control means 6 which controls the instant of firing of the guided diode S1 in a manner to be explained. The diode CR1 is a high current capacity device since it carries load current, and diode CR2 is a low current capacity device. The boost voltage source 13″ is shown as a secondary winding of a transformer operating from a suitable A.C. supply source 8. The transformer has a primary winding 13′ and a second secondary winding 13‴.

The anode of the diode CR1 is connected to the positive terminal of the battery source 2, the negative terminal thereof being grounded. Diode CR1 is connected so that the current from the battery source 2 flows through the diode in the low impedance direction thereof. A filter choke 9 is connected between the cathode of diode CR1 and the load resistor RL, and a filter capacitor 11 is connected between the load end of the choke 9 and the negative or ground terminal of the battery source 2. The choke 9 and the capacitor 11 filter out rectified pulsating current components from the regulator circuit output.

One end of the transformer secondary winding 13″ is connected to the positive terminal of the battery source 2 and the other end thereof is connected to the anode 15 of the gated diode S1. The cathode 17 of the gated diode S1 is connected to the juncture of the diode CR1 and the choke 9. The gated diode S1 is thus arranged to pass only the half cycle of the alternating current signal in the winding 13″ which is in additive relation to the output of the battery source 2 when it is triggered into operation.

A control circuit for the gated diode S1 is provided including the secondary winding 13‴ of the transformer 13, one end of which is connected to the juncture of the anode 15 of the gated diode S1 and the secondary winding 13′, and the other end of which is connected to the anode of a low power diode CR2 arranged to pass only the half cycle of the alternating current signal in the winding 13‴ capable of triggering the gated diode S1.

The diode CR2 is connected in turn to a variable impedance or gate element 6a in turn controlled by the output responsive control means 6. When the variable impedance or gate element 6a has a relatively large impedance it effectively de-couples the voltage in the secondary winding 13''' from the control electrode 19 of the gated diode S1, and when it has a relatively low impedance it couples this voltage to the control electrode 19 of the gated diode S1 to fire the same. A resistor R1 is shown connected between the variable impedance or switch element 6a and the cathode 17 of the gated diode.

The gated diode S1 is most advantageously a silicon semiconductor device (sometimes referred to as a silicon controlled rectifier) which operates in a similar manner to a thyratron tube in that, upon application of a suitable control voltage to the control terminal 19 (assuming, further, the connection of a supply voltage of proper polarity), the device will become highly conductive and will remain so even when the control voltage is removed, until the polarity of the supply voltage across the anode and cathode thereof is reversed from its normal polarity or the current flow therethrough is otherwise interrupted. A positive voltage of a given magnitude is required to fire the gated diode S1 illustrated in FIG. 1. The trigger voltage for the diode S1 is derived from the secondary winding 13''' of the transformer 13. The sense of the voltage between the bottom and upper ends of the secondary winding 13''' is the same as the sense of the voltage between the bottom and upper ends of the secondary winding 13'' and is of a proper polarity to fire the gated diode S1 shown in the drawings during the positive going portion of the A.C. voltage if it is coupled to the control electrode 19 of the gated diode. The conduction of the gated diode is extinguished during the negative going portion of this A.C. voltage.

When the variable impedance or gate element 6a blocks the voltage induced in the transformer 13''' from the control electrode 19 of the gated diode S1, the latter remains non-conductive so that the output of the booster circuit receives current only from the direct current battery supply 2 through the main diode CR1. Normally the variable impedance or gate element is in a high impedance signal blocking condition. The output responsive means 6 which controls the variable impedance or gate element 6a is coupled to the output of the booster circuit in an exemplary manner to be described, and controls the instant in each cycle of the A.C. signal voltage in the secondary winding 13''' when the variable impedance or gate element 6a has a relatively low impedance where the A.C. voltage is coupled to the control electrode 19 of the gated diode S1 to trigger the same. As the output voltage of the booster circuit tends to drop, the variable impedance or gate element 6a will be operated to its low impedance condition sooner in each cycle and the period during which the gated diode S1 will be conductive each cycle increases. Conversely, as the output voltage of the booster circuit tends to rise, the variable impedance or switch element 6 will be operated to its low impedance condition later in the cycle and the period during which the gated diode will be conductive each cycle decreases.

The operation of the booster circuit just described is illustrated in FIG. 2 wherein voltage waveform (a) illustrates the A.C. voltage waveform induced in the secondary winding 13''' of the transformer 13 and voltage waveforms (b) and (c) illustrate the voltage waveform between the reference point 20 connected to the cathode electrodes of the gated diode S1 and the diode CR1 and ground (which is the negative terminal of the direct current battery supply 2). Each of these waveforms comprises a fixed component contributed by the direct current battery supply 2 and that portion of the A.C. voltage waveform appearing across the secondary winding 13''' which is coupled through the gated diode S1 to the point 20 in the booster circuit. It should be apparent that when the gated diode S1 is conducting, the voltage conditions across the main diode CR1 are such that the latter diode will be non-conductive except, perhaps, when the A.C. voltage waveform is reversing in polarity. In waveform (b) of FIG. 2, the output of the battery supply 2 is 20 volts and the gated diode S1 is conductive for a full half cycle to contribute an average voltage of 5 volts to the overall voltage waveform. The filter circuit in the output of the booster circuit produces a filtered direct current output which is approximately 25 volts. In waveform (c) the direct current component of the resultant voltage waveform contributed by the battery supply is 22½ volts and the gated diode S1 is conductive for only one quarter of a cycle to contribute an average voltage of 2½ volts to the overall voltage waveform to produce a resultant average voltage of 25 volts.

Refer now to FIG. 3 which shows a form of the present invention where the output responsive means 6 is a magnetic amplifier device responsive to Zener bridge circuit 21 connected across the load resistor RL. The bridge circuit includes a resistor 23 connected between the upper end of the load resistor RL and a Zener diode 25. The Zener diode is a well known semiconductor device which acts as a voltage stabilizer when connected in series with a resistor and a given voltage source. It is assumed that the Zener diode will maintain a voltage, for example, of 10 volts between the cathode and anode electrodes thereof. The resistor 23 and the Zener diode form a pair of arms of the bridge circuit. The other pair of arms of the bridge circuit are formed by resistors 27 and 29 connected between the positive side of the bridge circuit and ground, the resistor 29 being an adjustable resistor. The magnetic amplifier 6 is connected by a pair of conductors to the juncture of the two aforementioned pairs of bridge arms. An output control voltage is thus obtained which is a function of the relative magnitudes of a given predetermined fraction of the output voltage of the booster circuit and the reference voltage provided by the Zener diode.

The magnetic amplifier 6 is a low power dissipation device having windings 6a, 6b and 6c wound on a core 6d of rectangular hysteresis material. The winding 6a is the variable impedance or gate element 6a in FIG. 1 connected between the secondary winding 13''' and the control electrode 19 of the gated diode S1. For reasons to be explained, a low current capacity diode CR3 is interposed between the winding 6a and the control electrode 19. The winding 6a acts as a relatively high impedance when the core 6d is unsaturated and as a relatively low impedance when the core is saturated. The condition of the core is controlled by control windings 6b and/or 6c in which flow bias currents which are functions of the voltage conditions in the booster circuit. The direction of flow of the bias current in control winding 6b is such that the magnetomotive force generated in core 6b thereby opposes the magnetomotive force developed therein by the current flowing in the magnetic amplifier winding 6a connected to the secondary winding 13''. The bias current also acts as a reset current for the magnetic amplifier during the negative swing of the A.C. signal voltage applied to the control circuit of the gated diode. It also determines the period during which the magnetic amplifier core will be saturated during each active half cycle of the transformer voltage. Saturation of the latter core will result in firing of the gated diode S1 resulting in a boost voltage proportional to the time in the half cycle involved when the diode is conductive. The opposite ends of the magnetic amplifier control winding 6b are connected respectively between the juncture of the lower resistors 27 and 29, on the one hand, and the juncture of resistor 23 and the Zener diode, on the other hand, of the bridge circuit. The adjustable resistor 29 provides an adjustment for the control level of the boost circuit.

The resistor 29 may be adjusted so that a maximum reset or bias current flows in the magnetic amplifier winding 6b to minimize the saturation period of the magnetic amplifier when the battery voltage 2 is a maximum and hence minimize the firing time of the gated diode S1. If the battery voltage is below this maximum, any tendency of the output voltage to drop will result in a diminution of bridge unbalance and the bias current flowing in winding 6b so that the magnetic amplifier core will saturate sooner to advance the firing time of the gated diode S1. When the voltage of the battery is at a minimum, the bridge unbalance is at a minimum so that the bias current flowing through winding 6b is at a minimum where, for example, the magnetic core may be saturated for almost a full half cycle. This, in turn, will cause the gated diode S1 to be conductive for substantially a full half cycle to provide a maximum boost voltage.

Prior to the time that the magnetic amplifier 6 becomes saturated, a magnetizing current will flow in the winding 6a thereof. This magnetizing current provides a voltage drop across the resistor R1 which, due to the small value of R1, is insufficient to fire the gated diode S1. The blocking diode CR3, however, provides added protection against the premature firing of the gated diode because this diode requires a given minimum voltage level (such as .6 of a volt) before it will pass current. The small voltage drop across resistor R1 due to the magnetizing current is, of course, kept below the .6 of a volt necessary to cause conduction of the blocking diode CR3.

As previously indicated, substantially immediately after the gated diode S1 fires, the main blocking diode CR1 becomes non-conductive due to the resulting positive back bias voltage coupled to the cathode electrode thereof through the low impedance path of the gated diode S1. When the gated diode S1 is fired, the control circuit therefor including the secondary winding 13''', the blocking diode CR2, the magnetic amplifier winding 6a and resistor R1 are effectively short circuited so that substantially little power is drawn by the control circuit. The current then flowing in the winding 6b in the following half cycle resets the core of the magnetic amplifier 6.

Although it is possible to provide a sufficient range of current in the winding 6b using the bridge circuit 21 to provide regulation, it is preferred to provide an additional output voltage responsive circuit for controlling the timing of the saturation of the core 6d of the magnetic amplifier 6. It is desirable for power efficiency reasons that the impedance of the bridge circuit 21 be relatively high so that there is minimum current drain in the output load circuit of the regulator circuit. In such case, the resulting current flow in the output lines extending from the bridge circuit 21 to the magnetic amplifier windings 6b is accordingly small which, in the absence of additional output voltage responsive means to be described would require a much larger number of windings to produce a magnetomotive force in the core to delay the saturation of the core by the required amount to effect the necessary control over regulation.

It is, accordingly, another aspect of the invention to use the second control winding 6c of the magnetic amplifier 6 connected in a circuit extending between the source of direct current voltage 2 and the output of the regulator circuit, so that current flow in the winding 6c is a function of the difference between the output of the source of direct current voltage and the output of the regulator circuit. Much larger currents flow through winding 6c than in winding 6b and fewer windings are accordingly needed. Much less power loss is involved, however, in this circuit than would be the case of similar current levels flowing in the output of the bridge circuit 21. One of the ends of the winding 6c is connected by a conductor 32 to the positive terminal of the source of direct current voltage 2 and the other end of the other winding 6c is connected by a conductor 34 to a variable resistor 36 to the filtered output of the regulator circuit.

The resistor 36 may be adjusted to provide a maximum boost voltage (i.e., allow saturation of the core 6d for the full half cycle of the alternating current signal involved), when the source of direct current voltage 2 is at its minimum value to be regulated. The current flowing in the winding 6c is as shown in FIG. 3, where the magnetomotive force generated thereby aids the magnetomotive force generated by the current flowing in the winding 6a by biasing the core at the knee point "A" shown in the hysteresis curve of FIG. 3A. In this condition, the variable resistor 29 of the bridge circuit may be adjusted to provide a balanced condition in the Zener bridge circuit 21, so that practically no current flows through the winding 6b. When the source of direct current voltage 2 has a potential greater than the minimum value to be regulated, the voltage at the juncture between bridge arms 27 and 29 will be positive with respect to the fixed voltage between the resistor 23 and the Zener diode 25, resulting in current flow through the winding 6b in a direction which back biases the operating point of the core to a point such as "B" or to the kneee point "C." This will introduce a delay in the timing of the saturation of the core to decrease the boost voltage to the desired level.

The preferred form of the present invention utilizes a full wave rather than a half wave circuit. FIG. 4 illustrates the full wave circuit which basically comprises a duplication of the circuit shown in FIG. 3 with the proper connections for providing a full wave circuit. In such case, two magnetic amplifiers 6—6 and gated diodes S1—S1 are used, the windings 6b—6b and 6c—6c of the magnetic amplifiers being respectively connected in series as illustrated. The transformer 13 is provided with additional windings 13'' and 13''' so that the gated diodes S1 and S1 are rendered operative during successive half cycles. The operation of this circuit is substantially identical to that previously described in connection with FIG. 3 except that a boost voltage is generated each half cycle rather than once every cycle of the alternating current signal.

Refer now to FIG. 5 which shows a modification of the embodiment of FIG. 4 comprises the addition of chokes 40—40 in series with the gated diodes S1—S1. Each of the gated diodes S1 normally switch on in approximately one microsecond. At that time, if either the other gated diode or the main diode CR1 is still conducting, an excessive reverse current will flow until the latter diodes have regained a blocking state. This reverse current greatly reduces efficiency of the circuit. The chokes 40—40 prevent a rapid build-up of current through the gated diode which is in the process of being triggered on and thus allows the main diode CR1 or the other gated diodes to regain its blocking state in a manner which avoids the excessive reverse current flow problem referred to.

FIG. 6 shows another arrangement of FIG. 4 which reduces the rapid rise of current in a newly triggered gated diode. In this circuit, a diode CR4 is connected in the line extending from the juncture of the windings 13''—13'' to the diode CR1. The anode electrodes of the diodes CR1-CR4 are connected together and the cathode electrode of the diode CR4 is connected to the juncture of the latter transformer windings. The current rise time in the diode CR4 in series with the gated diodes S1—S1 is much less than that of the gated diodes. Since the rate of rise of the reverse voltage appearing across the gated diode to be blocked is less than the current rise time in the diode CR4, the blocking state can be regained without excessive reverse current.

Refer now to FIG. 7 which shows a further modification of the present invention wherein the timing for the triggering of the gated diodes S1—S1 is controlled by a special oscillator circuit generally indicated by reference numeral 46 instead of the magnetic amplifier previously described. This circuit also differs from that shown in FIG. 4 in that the cathode electrodes of the diodes CR1 and S1—S1 are connected by a ground conductor 47 to the negative leg of the battery source 2. The positive terminal of the battery source is connected by a conductor 49 to the load resistor RL. The filter capacitor 11 shunts the load resistor RL and together with the resistor are connected in series with the filter choke 9 in turn connected to the conductor 50 extending to the anode of the main diode CR1. The outer ends of the transformer secondary windings 13″ and 13″ are respectively connected to the anode electrodes of the gated diodes S1—S1 as in the previous circuits.

The oscillator circuit 46 provides a pulse each half cycle of the alternating current signal voltage which pulse is timed in accordance with the output conditions of the regulator circuit. The oscillator circuit as illustrated includes a double base diode D1. The emitter electrode 51 of the double base diode D1 is connected to the juncture of a resistor 53 connected to a line 54 and a capacitor 55 connected to the ground line 47 associated with the negative terminal of the source of direct current voltage 2. An output responsive impedance device 56 is connected across the capacitor 55, the output impedance device constituting a variable resistance element connected to respond to variations in the output voltage of the regulator circuit by providing a resistance which is inversely proportional to the voltage output of the regulator circuit. The lower base 58 of the double base diode D1 is connected through a resistor 60 to the ground line 47, the resistor 60 constituting the output resistor of the oscillator across which the variably timed pulse appears. The second upper base 62 of the double base diode D1 is connected by a resistor 64 to the line 54. A resistor 65 is connected between the line 54 and the cathode electrodes of a pair of diodes 66 and 68. The anode electrode of diode 66 is connected to the upper transformer winding 13″ and the anode electrode of the diode 68 is connected to the bottom end of the lower transformer winding 13″. A Zener diode 70 is connected between the line 54 and the line 47 to limit the voltage applied to the oscillator circuit.

Each half cycle of the alternating current signal induced in the transformer windings 13″ or 13″, a positive voltage is coupled through the diode 66 or 68 to the Zener diode 70 which clips the waveform of the coupled voltage as illustrated by waveform (b) in FIG. 8. A substantially fixed potential is thus applied to the oscillator 46 each half cycle of the alternating current signal. The capacitor 55 then charges to this potential as shown by waveform (c) in FIG. 8. When the firing potential of the double base diode D1 is reached, the diode triggers and capacitor 55 discharges through the resistor 60 producing the pulse shown in waveform (e) of FIG. 8. The voltage appearing across the resistor 60 is coupled through lines 69 and a resistor 71 to the control electrode of the upper gated diode S1 and through a resistor 73 to the control electrode of the lower gated diode S1. The capacitor discharge pulse triggers the gated diode which is then coupled to a positive going voltage and thereby effectively grounds the upper or lower end of the transformer winding 13″ depending on the gated diode which is rendered conductive. This terminates the feeding of an energizing voltage to the oscillator circuit 46 through the diodes 66 or 68. The waveform of this energizing voltage is, accordingly, shown by waveform (a) in FIG. 8.

The time it takes for the capacitor 55 to charge to a triggering potential for the double base diode D1 is proportional to the impedance of the variable impedance device 56 shunting the same. The variable impedance element may constitute a transistor or the like whose base electrode is controlled from the output of the regulator circuit. Reference should now be made to FIG. 7A which illustrates an exemplary circuit which may be utilized for the variable impedance device 56 in FIG. 7. The variable impedance device as shown in FIG. 7A includes the chopper circuit 74 which in any suitable way is coupled across the load circuit of FIG. 7 so as to respond to the output voltage conditions of the circuit. The direct current output voltage thereof is converted to an alternating current by the chopper circuit 74 which is rectified by a rectifier circuit 78 to provide a direct current voltage with respect to ground which varies with the output voltage of the circuit in FIG. 7. It should be noted that this output voltage in FIG. 7 does not have a ground reference point which is the reason for the chopper and rectifier circuits 74 and 78. The output of the rectifier circuit 78 is fed to the base electrode 80 of a NPN transistor 82. The transistor 82 acts as a variable impedance depending upon the magnitude of the control voltage fed to the base electrode 80 thereof from the rectifier circuit 78. The emitter electrode 84 thereof is connected by a biasing diode 86 to ground line 47. A bias-forming resistor 88 is connected between the emitter electrode 84 and the positive voltage line 54. The collector electrode 90 of the transistor 82 is connected to the juncture between capacitor 55 and resistor 53.

It should be understood that numerous modifications may be made of the preferred forms of the invention illustrated in the drawings and described above without deviating from the broader aspects of the invention. For example, the main application of the invention described above is in a booster regulator circuit where the voltage generated by the booster circuit adds an incremental voltage for regulation purposes to the output of a direct current voltage source 2. In such case, the A.C. supply source 8 need only be a relatively low power square wave or sine wave generator circuit energized from the source of direct current voltage 2. The booster circuit per se constitutes an A.C. to D.C. converter circuit and can be used as such to provide a regulated D.C. output when the direct current voltage source 2 is omitted entirely, provided that the A.C. supply source 8 has sufficient current capacity to supply the load current requirements. In such case, the voltage source 2 is replaced by a jumper wire and diode CR1 is omitted from the circuits described. Also, the control winding 6c of magnetic amplifier 6 and the associated variable resistor 36 would be omitted since they would serve no useful purpose without the direct current voltage source 2.

What I claim as new and desire to protect by Letters Patent of the United States is:

1. In combination with a source of direct current voltage to be regulated, a regulator circuit for said source of direct current voltage which circuit has an input connected in series with the output of said source of direct current voltage and an output at which a relatively constant direct current voltage is to appear despite a variation in the output voltage of said source of direct current voltage over a given range of voltages, said regulator circuit comprising: a source of boost voltage and gate means connected in series between the output of said source of direct current voltage and the output of the regulator circuit, control means responsive to the voltage output of the regulator circuit for periodically opening the gate means for a time interval inversely proportional to the amplitude of the output voltage of said source of direct current voltage during which time the boost voltage passing through said gate means adds to the output of said source of direct current voltage, gate bypassing means for coupling the output of said source of direct current voltage directly to said regulator circuit output when said gate means is closed, and filter circuit means for filtering varying voltage components from the output of the regulator circuit.

2. In combination with a source of direct current voltage to be regulated, a regulator circuit for said source of direct current voltage which circuit has an input connected in series with the output of said source of direct current voltage and an output at which a relatively constant direct current voltage is to appear despite a variation in the output voltage of said source of direct current voltage over a given range of voltages, said regulator circuit comprising: a source of alternating current boost voltage and gate means connected in series between the output of said source of direct current voltage and the output of the regulator circuit, control means responsive to the voltage output of the regulator circuit for opening the gate means each half cycle of the alternating current voltage which adds to the output of the direct current voltage source and for a time interval inversely proportional to the amplitude of the output voltage of said source of direct current voltage to couple the resultant addition voltage to the regulator circuit output, gate bypassing means for coupling the output of said source of direct current voltage directly to said regulator circuit output when said gate means is closed, and filter circuit means for filtering varying voltage components from the output of the regulator circuit.

3. In combination with a source of direct current voltage to be regulated, a regulator circuit having an input connected in series with the output of said source of direct current voltage and an output at which a regulated direct current voltage is to appear, said regulator circuit comprising: a source of alternating current boost voltage, and gate means connected in series between the output of said source of direct current voltage and the output of the regulator circuit, said gate means comprising a current control device having load terminals connected in series with said boost voltage and direct current voltage sources and a control terminal for providing a highly conductive path between said load terminals when the outputs of said boost voltage and direct current voltage sources are in additive relation and a trigger voltage of a given polarity is fed to said control terminal, the highly conductive state of said current control device persisting once initiated independently of the trigger voltage applied to said control terminal until the highly conductive condition of the device is terminated by a reversal of polarity of the alternating current boost voltage, control means responsive to the voltage output of the regulator circuit by periodically feeding a trigger voltage to said control terminal to trigger said current control device at a point in each half cycle of the alternating current voltage which adds to the output of the direct current voltage source which is spaced from the end of the half cycle involved a time interval proportional to the amplitude of the output of said source of direct current voltage, wherein a boost voltage is fed through said current control device to the regulator circuit output for a period dependent upon the boost voltage required, gate bypassing means for coupling the output of said source of direct current voltage directly to said regulator circuit output when said current control device is non-conductive, and filter circuit means for filtering the varying voltage components from the output of the regulator circuit.

4. In combination with a source of direct current voltage to be regulated, a regulator circuit which circuit has an input connected in series with the output of said source of direct current voltage and an output at which a regulated direct current voltage is to appear, said regulator circuit comprising: a source of alternating current boost voltage, and gate means connected in series between the output of said source of direct current voltage and the output of the regulator circuit, said gate means comprising a current control device having load terminals connected in series with said boost voltage and direct current voltage sources and a control terminal for providing a highly conductive path between said load terminals when the outputs of said boost voltage and direct current voltage sources are in additive relation and a trigger voltage of a given polarity is fed to said control terminal, the highly conductive state of said current control device persisting once initiated independently of the trigger voltage applied to said control terminal until the highly conductive condition of the device is terminated by a reversal of polarity of the alternating current boost voltage, control means for triggering said current control device, said control means comprising a magnetic amplifier having a saturable core around which is wound at least two windings, a second source of alternating current voltage of the same frequency and phase as said alternating current boost voltage, means connecting said second source of alternating current voltage and one of said windings in series with the control terminal of said current control device, the latter winding acting as a high impedance to de-couple said second source of voltage from said control terminal until said core is saturated, and means coupling the other winding to points in the regulator circuit which are responsive to the output voltage thereof for providing a magnetomotive force in opposition to the magnetomotive force developed by the current in said one winding to vary the timing of the saturation of the core in accordance with the output voltage conditions of the regulator circuit, gate bypassing means for coupling the output of said source of direct current voltage directly to said regulator circuit output when said current control device is non-conductive, and filter circuit means for filtering the varying voltage components from the output of the regulator circuit.

5. In combination with a source of direct current voltage to be regulated, a regulator circuit for said source of direct current voltage which circuit has an input connected in series with the output of said source of direct current voltage and an output at which a relatively constant direct current voltage is to appear despite a variation in the output voltage of said source of direct current voltage over a given range of voltages, said regulator circuit comprising: a source of alternating current boost voltage and a gated diode connected in series between said source of direct current voltage and the output of the regulator circuit to provide a highly conductive state for said gated diode during the half cycle which is in additive relation to said source of direct current voltage, said gated diode having a control terminal for triggering the same into a highly conductive state, control means responsive to the voltage output of the regulator circuit for generating a triggering pulse which is fed to said control terminal of the gated diode during the half cycle of the alternating current boost voltage which is in additive relation to said source of direct current voltage to trigger the same, the phase of said triggering pulse being dependent upon the boost voltage required by the regulator circuit, a bypasser rectifier for coupling the output of said source of direct current voltage directly to said regulator circuit output when said gated diode is non-conductive, and filter circuit means for filtering varying voltage components from the output of said regulator circuit.

6. The combination of claim 5 wherein there is provided means for increasing the rise time for the current through said gated diode.

7. The combination of claim 5 wherein there is provided choke means in series with said gated diode to increase the rise time of the current flow in said gated diode.

8. In combination with a source of direct current voltage to be regulated, a booster regulator circuit for said source of direct current voltage which circuit has an input connected in series with the output of said source of direct current voltage and an output at which a relatively constant direct current voltage is to appear despite a variation in the output voltage of said source of direct current voltage over a given range of voltages, said regulator circuit comprising: a source of alternating current voltage, a transformer having a primary winding coupled to said source of alternating current voltage, a secondary winding, a rectifier, means connecting said source of direct current voltage and said rectifier in a first loop circuit wherein the rectifier is arranged to pass the output of said source of direct current voltage to said load, a gated diode, means connecting said secondary winding and said gated diode in series across said rectifier where the gated diode is arranged to pass current for the half cycles of the alternating current voltage induced in said secondary winding which are in additive relation to said source of direct current voltage in the regulator circuit, said gated diode having a control terminal for triggering the gated diode into a highly conductive state, variable phase pulse generating means responsive to the output of said regulator circuit for feeding a triggering pulse to the control terminal of said gated diode during said half cycles of said alternating current voltage which are in additive relation to said source of direct current voltage and at an instant of time spaced from the end of the half cycles involved a time interval proportional to the boost voltage requirements of the regulator circuit, and filter circuit means for filtering varying voltage components from the output of the regulator circuit.

9. The combination of claim 5 wherein said control means includes a second source of alternating current voltage of the same frequency as said source of alternating current boost voltage, a saturable core device having a fate winding connected in series between said control source of alternating current voltage and the control terminal of said gated diode to provide a triggering voltage pulsation to the control terminal of said gated diode when the core device is saturated, said saturable core device also having a control winding, an output sensing circuit comprising a source of fixed direct voltage, and means for providing a voltage proportional to the differences between the output voltage of the regulator circuit and said source of fixed direct current voltage and for feeding a current proportional to said voltage to said control winding in a direction which produces a magnetomotive force which opposes the magnetomotive force developed by the current flow in said gate winding during the half cycles of said alternating current voltage capable of triggering said gated diode.

10. The combination of claim 5 wherein said control means includes a second source of alternating current voltage of the same frequency as said source of alternating current boost voltage, a saturable core device having a gate winding connected in series between said source of second source of alternating current voltage and the control terminal of said gated diode to provide a triggering voltage pulsation to the control terminal of said gated diode when the core device is saturated, said saturable core device also having a first and a second control winding, an output sensing circuit comprising a source of fixed direct current voltage, means for providing a voltage proportional to the differences between the output voltage of the regulator circuit and said source of fixed direct current voltage and for feeding a current proportional to said voltage to said first control winding in a direction which produces a magnetomotive force which opposes the magnetomotive force developed by the current flow in said gate winding during the half cycle of said alternating current voltage capable of triggering said gated diode, and means connecting said control winding between said source of direct current voltage and the output of said regulator circuit for providing current flow in said second control winding which effects saturation of the saturable core device for a full half cycle when maximum boost voltage is required.

11. In combination with a source of direct current voltage to be regulated, a regulator circuit for said source of direct current voltage which circuit has an input connected in series with the output of said source of direct current voltage and an output at which a relatively constant direct current voltage is to appear despite a variation in the output voltage of said source of direct current voltage over a given range of voltages, said regulator circuit comprising: a source of alternating current voltage, a transformer having a primary winding coupled to said source of alternating current voltage, a first secondary winding and a second secondary winding, a rectifier, means connecting said source of current voltage and said rectifier in a first loop circuit wherein the rectifier is arranged to pass the output of said source of direct current voltage to said load, a gated diode having load terminals and a control terminal, means connecting said secondary winding and the load terminals of said gated diode in series across said rectifier where the gated diode is arranged to pass current during the alternate half cycles of the alternating current voltage induced in said first secondary winding which are in additive relation to said source of direct current voltage, said control terminal of said gated diode triggering the same into a highly conductive state when a control voltage of proper polarity is fed thereto, gate means, control circuit forming means connecting said second secondary winding and said gate means in series with the control terminal of said gated diode to effect triggering of the gated diode by the voltage induced in said second secondary winding when the voltage in said first secondary winding is in additive relation to said source of direct current voltage, control means responsive to the output of the regulator circuit for opening said gate means at a point in said alternate half cycles of the voltage in said first secondary winding which is in additive relation to said source of direct current voltage, which point is spaced from the end of the half cycles involved an amount inversely proportional to the boost voltage requirements of the regulator circuit, and filter circuit means for filtering varying voltage components from the output of the regulator circuit.

12. In combination with a source of direct current voltage to be regulated, a regulator circuit for said source of direct current voltage which circuit has an input connected in series with the output of said source of direct current voltage and an output at which a relatively constant direct current voltage is to appear despite a variation in the output voltage of said source of direct current voltage over a given range of voltages, said regulator circuit comprising: a source of alternating current voltage, a transformer having a primary winding coupled to said source of alternating current voltage, a first secondary winding and a second secondary winding, a rectifier, means connecting said source of current voltage and said rectifier in a first loop circuit wherein the rectifier is arranged to pass the output of said source of direct current voltage to said load, a gated diode having load terminals and a control terminal, means connecting said secondary winding and the load terminals of said gated diode in series across said rectifier where the gated diode is arranged to pass current for the half cycle of the alternating current voltage induced in said first secondary winding which is in additive relation to said source of direct current voltage, said control terminal of said gated diode triggering the same into a highly conductive state when a control voltage of proper polarity is fed thereto, gate means, control circuit forming means connecting said second secondary winding and said gate means in series with the control terminal of said gated diode and across the load terminals thereof to effect triggering of the gated diode by the voltage induced in said second secondary winding when the gate means is opened, the triggering of said gated diode reducing the current drain in the control circuit thereof, control means responsive to the output of the regulator circuit for opening said gate means at a point in each half cycle of the voltage in said first secondary winding which is in additive relation to said source of direct current voltage, which point is spaced from the end of the half cycle an amount inversely proportional to the boost voltage requirements of the regulator circuit, and filter circuit means for filtering varying voltage components from the output of the regulator circuit.

13. In combination with a source of direct current voltage to be regulated, a regulator circuit for said source of direct current voltage which circuit has an input connected in series with the output of said source of direct current voltage and an output at which a relatively constant direct current voltage is to appear despite a variation in the output voltage of said source of direct current voltage over a given range of voltages, said regulator circuit comprising: a source of alternating current voltage, a transformer having a primary winding coupled to said source of alternating current voltage, a first secondary winding and a second secondary winding, a rectifier, means connecting said source of current voltage and said rectifier in a first loop circuit wherein the rectifier is arranged to pass the output of said source of direct current voltage to said load, a gated diode having load terminals and a control terminal, means connecting said secondary winding and the load terminals of said gated diode in series across said rectifier where the gated diode is arranged to pass current for the half cycle of the alternating current voltage induced in said first secondary winding which is in additive relative relation to said source of direct current voltage, said control terminal of said gated diode triggering the same into a highly conductive state when a control voltage of proper polarity is fed thereto, a saturable core device having a gate winding and a control winding, control circuit forming means connecting said secondary winding and said gate winding of said saturable core device in series with the control terminal of said gated diode and across the load terminals thereof to effect triggering of the gated diode by the voltage induced in said second secondary winding when the saturable core device is saturated and the voltage in said first secondary winding is in additive relation to said source of direct current voltage, the triggering of said gated diode reducing the current drain in the control circuit thereof, means coupling said first control winding to a portion of the regulator circuit which provides therein a current which is inversely proportional to the boost voltage requirements of the regulator circuit and which generates a magnetomotive force which opposes the magnetomotive force developed in said gate winding during the half cycle on said alternating current voltage which is capable of triggering said gated diode, whereby to delay the saturation of the saturable core device an amount inversely proportional to the boost voltage requirements of the circuit, and filter circuit means for filtering varying voltage components from the output of the regulator circuit.

14. A regulated direct current voltage generator circuit comprising a source of alternating current voltage, a gated diode having a control terminal and load terminals, said load terminals being connected in series between said source of alternating current voltage and the output of the generator circuit, control means responsive to the voltage output of the voltage generator circuit for periodically feeding a triggering signal to said control terminal for rendering the gated diode conductive during the alternate half cycles of the alternating current voltage which effects a relatively high conductive state of said gated diode and for a time interval necessary to maintain a given control over the output of the generator circuit, filter circuit means including a filter choke in series with the load terminals of the gated diode for filtering varying voltage components from the output of the generator circuit, and a rectifier in series with said filter choke and in parallel with said gated diode for enabling the continuation of current flow through said choke after said current control device is rendered non-conductive.

15. The combination of claim 14 wherein said control means includes a second source of alternating current voltage of the same frequency as said source of alternating current voltage, a saturable core device having a gate winding connected in series between said second source of alternating current voltage and the control terminal of said gated diode to provide a triggering voltage pulsation to the control terminal of said gated diode when the core device is saturated, said saturable core device also having a control winding, an output sensing circuit comprising a source of fixed direct current voltage, and means for providing a voltage proportional to the difference between the output voltage of the generator circuit and said source of fixed direct current voltage and for feeding a current proportional to said voltage to said control winding in a direction which produces a magnetomotive force which opposes the magnetomotive force developed by the current flow in said gate winding during said alternate half cycles of said alternating current voltage capable of rendering said gated diode highly conductive.

16. A regulated direct current voltage generator circuit comprising: a source of alternating current voltage, and gated diode having load terminals connected in series between said source of alternating current voltage and the output of the generator cricuit and a control terminal for providing a highly conductive path between said load terminals when the output of said source of alternating current voltage is of a given polarity and a trigger voltage of a given polarity is fed to said control terminal, control means for triggering said gated diode comprising a magnetic amplifier having a saturable core around which is wound at least two windings, a second source of alternating current voltage of the same frequency and phase as said source of alternating current voltage, means connecting said second source of alternating current voltage and one of said windings in series with the control terminal of said gated diode, the latter winding acting as a high impedance to de-couple said second source of voltage from said control terminal until said core is saturated, and means coupling the other winding to points in the regulator circuit which are responsive to the output voltage thereof for providing a magnetomotive force in opposition to the magnetomotive force developed by the current in said one winding to vary the timing of the saturation of the core in accordance with the output voltage conditions of the regulator circuit, and filter circuit means for filtering the varying voltage components from the output of the generator circuit.

17. A regulated direct current voltage generator circuit comprising: a source of alternating current voltage, a transformer having a primary winding coupled to said source of alternating current voltage, a secondary winding, filter circuit means for filtering out fluctuating components from the output of the generator circuit, a gated diode, means connecting said secondary winding, said filter circuit, and the output of the generator circuit in a loop circuit where the gated diode is arranged to pass current during alternate half cycles of the alternating current voltage induced in said secondary winding, said gated diode having a control terminal for triggering the gated diode into a highly conductive state, and variable phase pulse generating means responsive to the output of said generator circuit for feeding a triggering pulse to the control terminal of said gated diode during said alternate half cycles of said alternating current voltage and at an instant of time spaced from the end of the half cycles involved a time interval proportional to the output voltage requirements of the generator circuit.

18. A regulated direct current voltage generator circuit comprising: a source of alternating current voltage, a transformer having a primary winding coupled to said source of alternating current voltage, a first secondary winding and a second secondary winding, a gated diode having load terminals and a control terminal, means connecting said secondary winding and the load terminals of said gated diode in series between said first secondary winding and the output of the generator circuit where the gated diode is arranged to pass current during alternate half cycles of the alternating current voltage induced in said first secondary winding, said control terminal of said gated diode triggering the same into a highly conductive state when a control voltage of a given polarity is fed thereto, gate means, control circuit forming means connecting said second secondary winding and said gate means in series with the control terminal of said gated diode to effect triggering of the gated diode during said alternate half cycles, control means responsive to the output of the regulator circuit for opening said gate means at points in said alternate half cycles of the voltage in said first secondary winding which maintains a fixed average output voltage, and filter circuit means for filtering the varying voltage components from the output of the generator circuit.

19. A regulated direct current voltage generator circuit comprising: a source of alternating current voltage, a transformer having a primary winding coupled to said source of alternating current voltage, a first secondary winding and a second secondary winding, a gated diode having load terminals and a control terminal, means conecting said secondary winding and the load terminals of said gated diode in series between said first secondary winding and the output of the generator circuit where the gated diode is arranged to pass current during alternate half cycles of the alternating current voltage induced in said first secondary winding, said control terminal of said gated diode triggering the same into a highly conductive state when a control voltage of a given polarity is fed thereto, gate means, control circuit forming means connecting said second secondary winding and said gate means in series with the control terminal of said gated diode and across the load terminals thereof to effect triggering of the gated diode during said alternate half cycles, the triggering of said gated diode reducing the current drain in the control circuit thereof, control means responsive to the output of the regulator circuit for opening said gate means at points in said alternate half cycles of the voltage in said first secondary winding which maintains a fixed average output voltage, and filter circuit means for filtering varying voltage components from the output of the regulator circuit.

20. A regulated direct current voltage generator circuit comprising: a source of alternating voltage, output terminals, a current control device having load terminals connected in series with said source of alternating current voltage and said output terminals and a control terminal for providing a highly conductive path between said load terminals when the outputs of said alternating current is of a given polarity and a trigger voltage of a given polarity is fed to said control terminal, the highly conductive state of said current control device persisting once initiated independently of the trigger voltage applied to said control terminal until the highly conductive condition of the device is terminated by a reversal of polarity of the alternating current boost voltage, control means responsive to the voltage at said output terminals for periodically feeding a trigger voltage to said control terminal to trigger said current control device at a point in each alternate half cycle of the alternating current voltage which provides a regulated output, filter circuit means including a filter choke connected in series with the load terminals of the current control device for filtering varying voltage components from the output of the generator circuit, and a rectifier in series with said filter choke and in parallel with said current control device for enabling the continuation of current flow through said choke after said current control device is rendered non-conductive.

References Cited by the Examiner

Electronic Design: "Controlled Rectifier Power Supply Is Short-Circuit Protected," Nov. 11, 1959, page 168.

LLOYD McCOLLUM, *Primary Examiner.*

MILTON O. HIRSHFIELD, *Examiner.*